(12) United States Patent
Kanzaki (10) Patent No.: US 7,718,735 B2
(45) Date of Patent: May 18, 2010

(54) POLYPROPYLENE RESIN COMPOSITION

(75) Inventor: Susumu Kanzaki, Kisarazu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 220 days.

(21) Appl. No.: 11/330,288

(22) Filed: Jan. 12, 2006

(65) Prior Publication Data

US 2006/0160942 A1 Jul. 20, 2006

(30) Foreign Application Priority Data

Jan. 14, 2005 (JP) .............................. 2005-007567

(51) Int. Cl.
*C08L 53/00* (2006.01)
*C08L 23/14* (2006.01)
*C08L 23/10* (2006.01)
*C08L 25/04* (2006.01)

(52) U.S. Cl. .................... 525/89; 525/240; 525/241; 524/451

(58) Field of Classification Search ............... 525/240, 525/88, 89, 95; 524/451
See application file for complete search history.

(56) References Cited

U.S. PATENT DOCUMENTS

| 5,723,527 | A | * | 3/1998 | Sadatoshi et al. | 524/451 |
| 5,914,363 | A | * | 6/1999 | Sadatoshi et al. | 524/451 |
| 6,011,102 | A | * | 1/2000 | Shimojo et al. | 524/451 |
| 6,306,972 | B1 | * | 10/2001 | Ohkawa et al. | 525/240 |
| 6,518,363 | B2 | * | 2/2003 | Kanzaki et al. | 525/240 |
| 6,593,409 | B2 | * | 7/2003 | Ohkawa et al. | 524/423 |
| 6,777,497 | B2 | * | 8/2004 | Kanzaki et al. | 525/191 |
| 6,869,993 | B2 | * | 3/2005 | Watanabe et al. | 524/210 |
| 6,906,143 | B2 | * | 6/2005 | Kanzaki | 525/240 |
| 7,439,296 | B2 | * | 10/2008 | Kanzaki | 524/505 |
| 2006/0058434 | A1 | * | 3/2006 | Watanabe | 524/210 |
| 2006/0135672 | A1 | * | 6/2006 | Kanzaki | 524/451 |
| 2006/0160941 | A1 | * | 7/2006 | Kanzaki | 524/451 |

FOREIGN PATENT DOCUMENTS

| EP | 841 369 A1 | * | 5/1998 |
| JP | 7-157627 | * | 6/1995 |

(Continued)

OTHER PUBLICATIONS

JP 7-157627 Jun. 1995, (abstract and translation in English).*
JP 2000-178389 Jun. 2000 (abstract and translation in English).*
JP 2004-143414 May 2004 (abstract and translation in English).*

*Primary Examiner*—David Wu
*Assistant Examiner*—Rip A. Lee
(74) *Attorney, Agent, or Firm*—Sughrue Mion, PLLC (57) ABSTRACT

Disclosed is a polypropylene resin composition including from 50 to 94% by weight of polypropylene resin, from 1 to 25% by weight of ethylene-α-olefin copolymer rubber including ethylene units and units of $C_{4-12}$ α-olefin, the copolymer having a density of 0.850-0.870 g/cm$^3$ and an MFR of 0.05-1 g/10 min, and from 5 to 25% by weight of inorganic filler, wherein the polypropylene resin is a propylene-ethylene block copolymer satisfying given requirements or a polymer mixture of the propylene-ethylene block copolymer and a propylene homopolymer. Molded articles made from the composition have good balance between rigidity and impact resistance and have good appearance.

6 Claims, 1 Drawing Sheet

FOREIGN PATENT DOCUMENTS

| | | | |
|---|---|---|---|
| JP | 09-71711 A | | 3/1997 |
| JP | 11-222547 | * | 8/1999 |
| JP | 2000-26697 A | | 1/2000 |
| JP | 2000-143904 | * | 5/2000 |
| JP | 2000-178389 | * | 6/2000 |
| JP | 2000-178389 A | | 6/2000 |
| JP | 2004-143414 | * | 5/2004 |
| JP | 2005-213490 | * | 8/2005 |

* cited by examiner

Fig. 1

POLYPROPYLENE RESIN COMPOSITION

BACKGROUND OF THE INVENTION

1. Field of the Invention

The present invention relates to polypropylene resin compositions and to injection molded articles made therefrom. In particular, the invention relates to a polypropylene resin composition which has superior fluidity and which is useful as a raw material of molded articles having good balance between rigidity and impact resistance and having, if any, unnoticeable weld lines and flow marks, and to a molded article made therefrom.

2. Description of the Related Art

Polypropylene resin compositions are materials excellent in rigidity, impact resistance, etc. and therefore are used for a wide variety of applications in the form, for example, of automotive interior or exterior components and housings of electric appliances.

For example, JP 9-71711 A discloses a propylene-based resin composition which includes a crystalline propylene-ethylene block copolymer including a propylene homopolymer portion and an ethylene-propylene random copolymer portion having an ethylene content of from 20 to 80% by weight, a melt flow rate (MFR) of from 25 to 140 g/10 min and an ethylene-α-olefin copolymer having a MFR of from 0.5 to 15 g/10 min, an ethylene triad sequence fraction of from 55 to 70%, and talc.

JP 2000-26697 A discloses a propylene-based resin composition which includes a crystalline propylene-ethylene block copolymer including a polypropylene homopolymer portion and an ethylene-propylene random copolymer portion having an ethylene content of 30% by weight or more and a weight average molecular weight of from 200,000 to 1,000,000; an ethylene-α-olefin or ethylene-α-olefin-diene copolymer rubber having an MFR of from 0.05 to 1.2 g/10 min; talc and a high density polyethylene having an MFR of 11 g/10 min or more.

JP 2000-178389 A discloses a polypropylene resin composition which includes a propylene-ethylene block copolymer including a propylene homopolymer portion wherein the MFR of the propylene homopolymer portion is 100 g/10 min or more and the MFR of the block copolymer is from 55 to 200 g/10 min; an ethylene-α-olefin copolymer rubber having an MFR of less than 0.9 g/10 min and a comonomer content of 28% by weight or more; and talc.

However, regarding molded articles made from the polypropylene resin compositions disclosed in the above-cited references, there are demands for improvement in balance between rigidity and impact resistance and elimination of weld lines and flow marks.

SUMMARY OF THE INVENTION

An object of the present invention is to provide a polypropylene resin composition which has superior fluidity and which is useful as a raw material of molded articles having good balance between rigidity and impact resistance and having, if any, unnoticeable weld lines and flow marks, and to provide a molded article made therefrom.

The present invention provides, in one aspect, a polypropylene resin composition comprising:

from 50 to 94% by weight of a polypropylene resin (A), from 1 to 25% by weight of an ethylene-α-olefin copolymer rubber (B) which includes units of α-olefin having 4-12 carbon atoms and ethylene units and has a density of from 0.850 to 0.870 g/cm$^3$ and a melt flow rate, as measured at a temperature of 230° C. and a load of 2.16 kgf, of from 0.05 to 1 g/10 min, and from 5 to 25% by weight of an inorganic filler (C), provided that the overall amount of the polypropylene resin composition is 100% by weight, wherein the polypropylene resin (A) is a propylene-ethylene block copolymer (A-1) satisfying requirements (1), (2), (3) and (4) defined below or a polymer mixture (A-3) comprising the propylene-ethylene block copolymer (A-1) and a propylene homopolymer (A-2), requirement (1): the block copolymer (A-1) is a propylene-ethylene block copolymer comprising from 55 to 90% by weight of a polypropylene portion and from 10 to 45% by weight of a propylene-ethylene random copolymer portion, provided that the overall amount of the block copolymer (A-1) is 100% by weight, requirement (2): the polypropylene portion of the block copolymer (A-1) is a propylene homopolymer or a copolymer comprising propylene units and 1 mol % or less of units of a comonomer selected from the group consisting of ethylene and α-olefin having 4 or more carbon atoms, provided that the overall amount of units constituting the copolymer is 100 mol %, requirement (3): the weight ratio of the propylene units to the ethylene units in the propylene-ethylene random copolymer portion of the block copolymer (A-1) is from 70/30 to 50/50, requirement (4): the propylene-ethylene random copolymer portion of the block copolymer (A-1) has an intrinsic viscosity $[\eta]_{EP\text{-}A\text{-}1}$ of not less than 4 dl/g but less than 5.5 dl/g.

In a preferred embodiment, the polypropylene resin (A) further includes a propylene-ethylene block copolymer (A-4), wherein the propylene-ethylene random copolymer portion included in the aforesaid block copolymer (A-4) has an intrinsic viscosity $[\eta]_{EP\text{-}A\text{-}4}$ of from 2 to 3 dl/g, or the content of the propylene-ethylene random copolymer portion included in the block copolymer (A-1) is 6% by weight or less of the amount of the polypropylene resin composition, provided that the amount of the propylene resin composition is 100% by weight, or the inorganic filler (C) is talc.

In another aspect, the present invention provides an injection molded article made from the polypropylene resin composition mentioned above.

According to the present invention, it is possible to obtain a polypropylene resin composition which has superior fluidity and which is useful as a raw material of molded articles having good balance between rigidity and impact resistance and having, if any, unnoticeable weld lines and flow marks, and to obtain a molded article made therefrom which has good balance between rigidity and impact resistance and has, if any, unnoticeable weld lines and flow marks.

DESCRIPTION OF THE PREFERRED EMBODIMENTS

The polypropylene resin composition of the present invention is a polypropylene resin composition including from 50 to 94% by weight of a polypropylene resin (A), from 1 to 25% by weight of an ethylene-α-olefin copolymer rubber (B), and from 5 to 25% by weight of an inorganic filler (C), provided that the overall amount of the polypropylene resin composition is 100% by weight.

The polypropylene resin (A) is a propylene-ethylene block copolymer (A-1) or a polymer mixture (A-3) including the block copolymer (A-1) and a propylene homopolymer (A-2).

The propylene-ethylene block copolymer (A-1) is a propylene-ethylene block copolymer including from 55 to 90% by weight of a polypropylene portion and from 10 to 45% by weight of a propylene-ethylene random copolymer portion, provided that the overall amount of the block copolymer is 100% by weight.

The block copolymer (A-1) preferably includes from 65 to 90% by weight of a polypropylene portion and from 10 to 35% by weight of a propylene-ethylene random copolymer portion, and more preferably includes from 70 to 85% by weight of a polypropylene portion and from 15 to 30% by weight of a propylene-ethylene random copolymer portion.

When the amount of the polypropylene portion is less than 55% by weight, the rigidity or hardness of molded articles made from the polypropylene resin composition may fail or the polypropylene resin composition may have an insufficient moldability because of failure in fluidity, whereas when the amount of the polypropylene portion is over 90% by weight, the toughness or impact resistance of molded articles may fail.

The polypropylene portion of the block copolymer (A-1) is a propylene homopolymer or a copolymer comprising propylene units and 1 mol % or less of units of at least one comonomer selected from the group consisting of ethylene and α-olefin having 4 or more carbon atoms, provided that the overall amount of units constituting the copolymer is 100 mol %. The above-mentioned α-olefins having 4 or more carbon atoms are preferably α-olefins having from 4 to 8 carbon atoms, examples of which include 1-butene, 1-hexene and 1-octene.

In the case where the polypropylene portion of the block copolymer (A-1) is a copolymer including propylene units and units of at least one comonomer selected from the group consisting of ethylene and α-olefins having 4 or more carbon atoms, when the content of the comonomer units is more than 1 mol %, the rigidity, heat resistance or hardness of molded articles made from the polypropylene resin composition may fail.

From the viewpoint of rigidity, heat resistance or hardness of molded articles made from a polypropylene resin composition, the polypropylene portion in the block copolymer (A-1) is preferably a propylene homopolymer, more preferably a propylene homopolymer having an isotactic pentad fraction, as measured by $^{13}$C-NMR, of 0.97 or more. More preferred is a propylene homopolymer having an isotactic pentad fraction of 0.98 or more.

The isotactic pentad fraction is a fraction of propylene monomer units existing at the center of an isotactic chain in the form of a pentad unit, in other words, the center of a chain in which five propylene monomer units are meso-bonded successively, in the polypropylene molecular chain as measured by a method reported in A. Zambelli et al., Macromolecules, 6, 925 (1973), namely, by use of $^{13}$C-NMR. The assignment of NMR absorption peaks is carried out according to the disclosure of Macromolecules, 8, 687 (1975).

Specifically, the isotactic pentad fraction is measured as an area fraction of mmmm peaks in all the absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

From the viewpoint of balance between fluidity of a resin composition in its molten state and toughness of molded articles, the intrinsic viscosity $[\eta]_P$ of the polypropylene portion of the block copolymer (A-1) is preferably from 0.7 to 1.3 dl/g, and more preferably from 0.85 to 1.1 dl/g. The intrinsic viscosity is measured in Tetralin at 135° C.

The molecular weight distribution, as measured by gel permeation chromatography (GPC), of the polypropylene portion of the block copolymer (A-1) is preferably not less than 3 but less than 7, more preferably from 3 to 5. As well known in the art, the molecular weight distribution, which is also referred to as a Q factor, is a ratio of the weight average molecular weight to the number average molecular weight, both average molecular weight being determined by GPC measurement.

From the viewpoint of balance between rigidity and impact resistance of molded articles made from a resin composition, the weight ratio of the propylene units to the ethylene units in the propylene-ethylene random copolymer portion of the block copolymer (A-1) is from 70/30 to 50/50, preferably from 65/35 to 55/45.

From the viewpoints of prevention of occurrence of weld lines and flow marks at the time of molding of a resin composition and balance between rigidity and impact resistance of resulting molded articles, the intrinsic viscosity $[\eta]_{EP\text{-}A\text{-}1}$ of the propylene-ethylene random copolymer portion of the block copolymer (A-1) is from 4.0 dl/g to 5.5 dl/g, and preferably from 4.5 to 5.3.

From the viewpoints of moldability of a resin composition and the impact resistance of molded articles, the melt flow rate (MFR), as measured at a temperature of 230° C. and a load of 2.16 kgf, of the propylene-ethylene block copolymer (A-1) is preferably from 10 to 120 g/10 min, and more preferably from 20 to 53 g/10 min.

The propylene-ethylene block copolymer (A-1) can be produced, for example, by a conventional polymerization method using a catalyst system obtained by causing (a) a solid catalyst component including magnesium, titanium, halogen and an electron donor as essential components to contact with (b) an organoaluminum compound and (c) an electron donor component. This type of catalyst can be prepared by the methods disclosed in JP 1-319508 A, JP 7-216017 A and JP 10-212319 A.

The propylene-ethylene block copolymer (A-1) can be produced, for example, by a method including at least two stages wherein a polypropylene portion is produced in a first step and then a propylene-ethylene random copolymer having an ethylene unit content of from 30 to 50% by weight and an intrinsic viscosity $[\eta]_{EP}$ of from 4.0 dl/g to 5.5 dl/g is produced in a second step.

Examples of the method of polymerization include bulk polymerization, solution polymerization, slurry polymerization and vapor phase polymerization. These polymerization techniques may be conducted either batchwise or continuously. Moreover, these may be optionally combined. From industrial and economic points of view, continuous vapor phase polymerization and continuous bulk-vapor phase polymerization are preferred.

More specific preferable examples are:

(1) a method in which in a polymerization apparatus including two or more polymerization reactors arranged in series, in the presence of the aforesaid catalyst system obtained by causing (a) a solid catalyst component to contact with (b) an organoaluminum compound and (c) an electron donor component, a polypropylene portion is produced in a first polymerization reactor and the product is transferred to a second polymerization reactor and then a propylene-ethylene random copolymer portion having an ethylene unit content of from 30 to 50% by weight and an intrinsic viscosity $[\eta]_{EP}$ of from 4.0 dl/g to 5.5 dl/g is produced continuously in the second polymerization reactor, and (2) a method in which in a polymerization apparatus including four or more polymerization reactors arranged in series, in the presence of the aforesaid catalyst system obtained by causing (a) a solid catalyst component to contact with (b) an organoaluminum compound and (c) an electron donor component, a polypropylene portion is produced in a first and second polymerization reactors and the product is transferred to a third polymerization reactor and then a propylene-ethylene random copolymer portion having an ethylene unit content of from 30 to 50% by weight and an intrinsic viscosity $[\eta]_{EP}$ of from 4.0 dl/g to 5.5 dl/g is produced continuously in the third and fourth polymerization reactors.

The amounts of the solid catalyst component (a), the organoaluminum compound (b) and the electron-donating component (c) and the manners in which each catalyst component is fed into the polymerization reactors may be determined appropriately according to conventional ways for use of conventional catalysts.

The polymerization temperature usually ranges from −30 to 300° C. and preferably from 20 to 180° C. The polymerization pressure is usually from an ambient pressure to 10 MPa and preferably from 0.2 to 5 MPa. A molecular weight regulator, e.g. hydrogen, may be used.

In the production of the propylene polymer (A-1), prepolymerization may be carried out before the main polymerization. An available method of preliminary polymerization is polymerization carried out by feeding a small amount of propylene in the presence of a solid catalyst component (a) and an organoaluminum compound (b) in a slurry state using a solvent.

Additives may optionally be added to the block copolymer (A-1). Examples of the additives include antioxidants, UV absorbers, lubricants, pigments, antistatic agents, copper inhibitors, flame retardants, neutralizing agents, foaming agents, plasticizers, nucleating agents, foam inhibitors and crosslinking agents. For improvement in heat resistance, weatherability and stability against oxidization, it is preferable to add an antioxidant or a UV absorber.

The block copolymer (A-1) maybe not only a polymer produced by the aforementioned method, but also a polymer obtained by subjecting the polymer produced by the aforementioned method to decomposition treatment including addition of a peroxide followed by melt-kneading.

The intrinsic viscosity $[\eta]_{EP-A}$ of the propylene-ethylene random copolymer portion included in the polymer obtained by the decomposition treatment is determined through measurement of an intrinsic viscosity of the polymer's component soluble in 20° C. xylene.

As the peroxide, an organic peroxide is typically used, examples of which include alkyl peroxides, diacyl peroxides, peroxyesters and peroxycarbonates.

Examples of the alkyl peroxides include dicumylperoxide, di-tert-butyl peroxide, tert-butylcumyl peroxide, 2,5-dimethyl-2,5-di(tert-butylperoxyl)hexane, 2,5-dimethyl-2,5-di(tert-butylperoxyl)hexyne-3, tert-butyl cumyl peroxide, 1,3-bis(tert-butylperoxyisopropyl)benzene, and 3,6,9-triethyl-3,6,9-trimethyl-1,4,7-triperoxononane.

Examples of the diacyl peroxides include benzoyl peroxide, lauroyl peroxide and decanoyl peroxide.

Examples of the peroxyesters include 1,1,3,3-tetramethylbutyl peroxyneodecanoate, α-cumyl peroxyneodecanoate, tert-butyl peroxyneodecanoate, tert-butyl peroxyneoheptanoate, tert-butyl peroxypivalate, tert-hexyl peroxypivalate, 1,1,3,3-tetramethylbutyl peroxy-2-ethylhexanoate, tert-amyl peroxy-2-ethylhexanoate, tert-butyl peroxy-2-ethylhexanoate, tert-butyl peroxyisobutyrate, di-tert-butyl peroxyhexahydroterephthalate, tert-amyl peroxyl-3,5,5-trimethylhexanoate, tert-butyl peroxy-3,5,5-trimethylhexanoate, tert-butyl peroxyacetate, tert-butyl peroxybenzoate, and di-tert-butyl peroxytrimethyladipate.

Examples of the peroxycarbonates include di-3-methoxybutyl peroxydicarbonate, di(2-ethylhexyl) peroxydicarbonate, diisopropyl peroxydicarbonate, tert-butyl peroxyisopropylcarbonate, di(4-tert-butylcyclohexyl) peroxydicarbonate, dicetyl peroxydicarbonate, and dimyristyl peroxydicarbonate.

From the viewpoint of prevention of occurrence of weld lines and flow marks, the content of the propylene-ethylene random copolymer portion included in the block copolymer (A-1) is 6% by weight or less of the amount of the polypropylene resin composition, provided that the amount of the propylene resin composition is 100% by weight.

The polypropylene resin (A) included in the polypropylene resin composition of the present invention may be the aforesaid block copolymer (A-1) or a polymer mixture (A-3) including the aforesaid block copolymer (A-1) and a propylene homopolymer (A-2).

In typical cases, the content of the block copolymer (A-1) included in the polymer mixture (A-3) is from 30 to 99% by weight and the content of the propylene homopolymer (A-2) is from 1 to 70% by weight. The content of the block copolymer (A-1) is preferably from 45to 90% by weight and the content of the propylene homopolymer (A-2) is preferably from 10 to 55% by weight.

The homopolymer (A-2) is preferably a homopolymer having an isotactic pentad fraction of 0.97 or more, more preferably a homopolymer having an isotactic pentad fraction of 0.98 or more.

The melt flow rate, as measured at a temperature of 230° C. and a load of 2.16 kgf, of the homopolymer (A-2) is typically from 10 to 500 g/10 min, preferably from 40 to 350 g/10 min.

The homopolymer (A-2) can be produced by polymerization using a catalyst similar to that for use in the preparation of the block copolymer (A-1).

The content of the polypropylene resin (A) included in the polypropylene resin composition of the present invention is from 50 to 94% by weight, preferably from 55 to 90% by weight, and more preferably from 60 to 85% by weight, provided that the overall amount of the polypropylene resin composition is 100% by weight.

When the content of the polypropylene resin (A) is less than 50% by weight, the rigidity of molded articles made from the polypropylene resin composition may fail, whereas when the content is over 93% by weight, the impact strength of such molded articles may fail.

From the viewpoints of prevention of occurrence of weld lines and flow marks and improvement in mechanical properties, a propylene-ethylene block copolymer (A-4) including a propylene-ethylene random copolymer portion having an intrinsic viscosity $[\eta]_{EP-A-4}$ of from 2 to 3 dl/g may be added to the polypropylene resin (A).

The block copolymer (A-4) is more preferably a propylene-ethylene block copolymer including a propylene-ethylene random copolymer portion having an intrinsic viscosity $[\eta]_{EP-A-4}$ of from 2 to 3 dl/g and an ethylene unit content of from 35 to 50% by weight.

The ethylene-α-olefin copolymer rubber (B) is an ethylene-α-olefin copolymer rubber including units of an α-olefin having 4-12 carbon atoms and ethylene units, the rubber having a density of from 0.850 to 0.870 g/cm$^3$ and a melt flow rate, as measured at a temperature of 230° C. and a load of 2.16 kgf, of from 0.05 to 1 g/10 min.

Examples of the α-olefin having 4-12 carbon atoms include butene-1, pentene-1, hexene-1, heptene-1, octene-1 and decene. Butene-1, hexene-1 and octene-1 are preferred.

From the viewpoint of impact strength, particularly low-temperature impact strength, of molded articles, the content of α-olefin units included in the copolymer rubber (B) is typically from 20 to 50% by weight, and preferably from 24 to 50% by weight, provided that the overall amount of the copolymer rubber (B) is 100% by weight.

Examples of the copolymer rubber (B) include ethylene-butene-1 random copolymer rubber, ethylene-hexene-1 random copolymer rubber and ethylene-octene-1 random copolymer rubber. Ethylene-octene-1 random copolymer or ethylene-butene-1 random copolymer is preferred. Two or more ethylene-α-olefin copolymer rubbers may be used together.

From the viewpoint of balance between rigidity and impact resistance of molded articles made from the resin composition, the density of the copolymer rubber (B) is typically from 0.850 to 0.870 g/cm$^3$, and preferably from 0.850 to 0.865 g/cm$^3$.

From the viewpoints of prevention of occurrence of weld lines and flow marks at the time of molding of a resin composition and balance between rigidity and impact resistance of resulting molded articles, the melt flow rate, as measured at a temperature of 230° C. and a load of 2.16 kgf, of the copolymer rubber (B) is typically from 0.05 to 1 g/10 min, and preferably from 0.2 to 1 g/10 min.

The copolymer rubber (B) can be prepared by copolymerizing ethylene and α-olefin using a conventional catalyst and a conventional polymerization method.

Examples of the conventional catalyst include a catalyst system composed of a vanadium compound and an organoaluminum compound, a Ziegler-Natta catalyst system or a metallocene catalyst system. The conventional polymerization method may be solution polymerization, slurry polymerization, high pressure ion polymerization or vapor phase polymerization.

The content of the copolymer rubber (B) included in the polypropylene resin composition of the present invention is from 1 to 25% by weight, preferably from 3 to 22% by weight, and more preferably from 5 to 22% by weight, provided that the overall amount of the polypropylene resin composition is 100% by weight.

When the content of the copolymer rubber (B) is less than 1% by weight, weld lines may occur in molded articles made from the resin composition or the impact strength of molded articles made from the resin composition may fail, whereas when the content is over 25% by weight, the rigidity of molded articles may fail.

Examples of the inorganic filler (C) include calcium carbonate, barium sulfate, mica, crystalline calcium silicate, talc and fibrous magnesium oxysulfate. Talc or fibrous magnesium oxysulfate is preferred. Talc is more preferable. Two or more sorts of inorganic filler may be used together.

The talc to be used as inorganic filler (C) is preferably one prepared by grinding hydrous magnesium silicate. The crystal structure of the molecule of the hydrous magnesium silicate is a pyrophyllite type three-layer structure. Talc comprises a lamination of this structure and preferably is a tabular powder obtained by fine pulverization of its crystals almost into its unit layers.

The talc preferably has an average particle diameter of 3 μm or less. By the average particle diameter of talc is meant a 50% equivalent particle diameter D50 calculated from an integrated distribution curve by the minus sieve method measured by suspending talc in a dispersion medium (water or alcohol) using a centrifugal sedimentation particle size distribution measuring device.

The inorganic filler (C) may be used without being subjected to any treatment or may be used after being surface treated with various types of surfactant for improving interfacial adhesiveness with or dispersibility in the polypropylene resin (A). The surfactant is exemplified by silane coupling agents, titanium coupling agents, higher fatty acids, higher fatty acid esters, higher fatty acid amides and higher fatty acid salts.

The average fiber length of fibrous magnesium oxysulfate to be used as the inorganic filler (C) is preferably from 5 to 50 μm, more preferably from 10 to 30 μm. The fibrous magnesium oxysulfate preferably has an average fiber diameter of from 0.3 to 2 μm, more preferably from 0.5 to 1 μm.

The content of the inorganic filler (C) included in the polypropylene resin composition of the present invention is from 5 to 25% by weight, preferably from 7 to 23% by weight, and more preferably from 10 to 22% by weight, provided that the overall amount of the polypropylene resin composition is 100% by weight.

When the content of the inorganic filler (C) is less than 5% by weight, the rigidity of molded articles made from the polypropylene resin composition may fail, whereas when the content is over 25% by weight, the impact strength of molded articles may fail.

The polypropylene resin composition of the present invention can be produced by melt-kneading its components. For the kneading, a kneading device such as a single screw extruder, a twin screw extruder, a Banbury mixer and heated rolls may be used. The kneading temperature is typically from 170 to 250° C., and the kneading time is typically from 1 to 20 minutes. All the components may be kneaded at the same time or successively.

The method for kneading the components successively may be any of options (1), (2) and (3) shown below.

(1) A method which includes kneading and pelletizing the aforesaid block copolymer (A-1) first and then kneading the pellets, the aforesaid copolymer rubber (B) and the aforesaid inorganic filler (C) together.

(2) A method which includes kneading and pelletizing the aforesaid block copolymer (A-1) first and then kneading the pellets, the aforesaid homopolymer (A-2), the aforesaid copolymer rubber (B) and the aforesaid inorganic filler (C) together.

(3) A method which includes kneading the aforesaid block copolymer (A-1) and the aforesaid copolymer rubber (B) and then adding the aforesaid inorganic filler (C), followed by kneading.

(4) A method which includes kneading the aforesaid block copolymer (A-1) and the aforesaid inorganic filler (C) and then adding the aforesaid copolymer rubber (B), followed by kneading.

In the method (3) or (4), a propylene homopolymer (A-2) may optionally be added.

The polypropylene resin composition of the present invention may include a variety of additives. Examples of the additives include antioxidants, UV absorbers, lubricants, pigments, antistatic agents, copper inhibitors, flame retardants, neutralizing agents, foaming agents, plasticizers, nucleating agents, foam inhibitors and crosslinking agents. In order to improve heat resistance, weather resistance and stability against oxidation, addition of an antistatic agent or a UV absorber is preferred. The content of each additive is typically from 0.001 to 1% by weight.

The polypropylene resin composition of the present invention may include an aromatic vinyl compound-containing rubber to improve the balance of mechanical properties.

Examples of the aromatic vinyl compound-containing rubber include block copolymers composed of aromatic vinyl compound polymer blocks and conjugated diene polymer blocks. Moreover, hydrogenated block copolymers derived from block copolymers composed of aromatic vinyl compound polymer blocks and conjugated diene polymer blocks through hydrogenation at all or part of their double bonds in their conjugated diene blocks are also available. The degree of hydrogenation of the double bonds of the conjugated diene polymer blocks is preferably 80% by weight or more, more preferably 85% by weight or more, provided that the overall amount of the double bonds in the conjugated diene polymer blocks is 100% by weight.

The molecular weight distribution (Q factor), as determined by gel permeation chromatography (GPC), of the aromatic vinyl compound-containing rubber is preferably 2.5 or less, more preferably from 1 to 2.3.

The content of units derived from aromatic vinyl compounds is preferably from 10 to 20% by weight, more preferably from 12 to 19% by weight, provided that the overall amount of the aromatic vinyl compound-containing rubber is 100% by weight.

The melt flow rate, as measured at a temperature of 230° C. and a load of 2.16 kgf according to JIS K6758, of the aromatic vinyl compound-containing rubber is preferably from 0.01 to 15 g/10 min, and more preferably from 0.03 to 13 g/10 min.

Specific examples of the aromatic vinyl compound-containing rubber include block copolymers such as styrene-ethylene-butene-styrene rubber (SEBS), styrene-ethylene-propylene-styrene rubber (SEPS), styrene-butadiene rubber (SBR), styrene-butadiene-styrene rubber (SBS) and styrene-isoprene-styrene rubber (SIS), and block copolymers resulting from hydrogenation of the foregoing block copolymers. Furthermore, rubbers obtained by causing an aromatic vinyl compound such as styrene to react with an ethylene-propylene-nonconjugated diene rubber (EPDM) may also be used. Two or more aromatic vinyl compound-containing rubbers may be used in combination.

The aromatic vinyl compound-containing rubber may be produced by a method in which an aromatic vinyl compound is bonded to an olefin-based copolymer rubber or a conjugated diene rubber through polymerization or a reaction.

The injection molded article of the present invention is one obtained by a known injection molding of the polypropylene resin composition of the present invention. Reflecting the characteristics of the polypropylene resin composition used as a raw material thereof, such injection molded articles have, if any, unnoticeable weld lines and flow marks and are superior in balance between rigidity and impact strength.

The injection molded article of the present invention can be suitably used particularly as automotive components such as door trims, pillars, instrument panels and bumpers.

EXAMPLES

The present invention will be explained below with reference to examples and comparative example. Methods for measuring physical properties of polymers and compositions of the present invention and those of the Examples and Comparative Examples are described below.

(1) Intrinsic Viscosity (unit: dl/g)

Reduced viscosities were measured at three concentrations of 0.1, 0.2 and 0.5 g/dl using a Ubbelohde viscometer. The intrinsic viscosity was calculated by a calculation method described in "Kobunshi Yoeki (Polymer Solution), Kobunshi Jikkengaku (Polymer Experiment Study) 11" page 491 (published by Kyoritsu Shuppan Co., Ltd., 1982), namely, by an extrapolation method in which reduced viscosities are plotted against concentrations and the concentration is extrapolated in zero. The measurements were carried out at 135° C. using Tetralin as a solvent.

(1-1) Intrinsic viscosity of propylene-ethylene block copolymer (1-1a) Intrinsic Viscosity of Polypropylene Portion: $[\eta]_P$ The intrinsic viscosity $[\eta]_P$ of the polypropylene portion included in a propylene-ethylene block copolymer was determined by the method described in (1) above using some polymer powder sampled from a polymerization reactor just after the first step for producing the polypropylene portion during the production of the propylene-ethylene block copolymer.

(1-1b) Intrinsic Viscosity of Propylene-ethylene Random Copolymer Portion: $[\eta]_{EP}$ The intrinsic viscosity $[\eta]_P$ of the propylene homopolymer portion included in a propylene-ethylene block copolymer and the intrinsic viscosity $[\eta]_T$ of the propylene-ethylene block copolymer were measured by the method described in (1) above. Then, the intrinsic viscosity $[\eta]_{EP}$ of the propylene-ethylene random copolymer portion in the propylene-ethylene block copolymer was determined from the equation provided below by use of a weight ratio, X, of the propylene-ethylene random copolymer to the propylene-ethylene block copolymer. The weight ratio X was determined by the method of (2) provided below.

$$[\eta]_{EP}=[\eta]_T/X-(1/X-1)\,[\eta]_P$$

$[\eta]_P$: Intrinsic viscosity (dl/g) of propylene homopolymer portion $[\eta]_T$: Intrinsic viscosity (dl/g) of propylene-ethylene block copolymer The intrinsic viscosity $[\eta]_{EP}$ of a propylene-ethylene random copolymer portion included in a propylene-ethylene block copolymer thermally decomposed with peroxide was an intrinsic viscosity of a component soluble in 20° C. xylene obtained by the method shown below.

[Component Soluble in 20° C. Xylene]

A propylene-ethylene block copolymer 5 g was dissolved completely in 500 ml of boiling xylene, then cooled to 20° C. and left to stand for four hours. The mixture was then filtered so that the matter insoluble in 20° C. was removed. The filtrate was concentrated through evaporation of xylene, followed by drying at 60° C. under reduced pressure. Thus, a polymer component soluble in 20° C. xylene was obtained.

(2) Weight Ratio of the Propylene-ethylene Random Copolymer Portion to the Propylene-ethylene Block Copolymer: X and Ethylene Content of the Propylene-ethylene Random Copolymer Portion in the Propylene-ethylene Block Copolymer: $[(C2')_{EP}]$ The above values were calculated from a $^{13}$C-NMR spectrum measured as described below according to the report of Kakugo, et al. (Macromolecules, 15, 1150-1152 (1982)).

In a test tube having a diameter of 10 mm, about 200 mg of a propylene-ethylene block copolymer was uniformly dissolved in 3 ml of o-dichlorobenzene to yield a sample solution, which was measured for its $^{13}$C-NMR spectrum under the following conditions:

Temperature: 135° C.
Pulse repeating time: 10 seconds
Pulse width: 45°
Accumulation number: 2500 times (3) Melt Flow Rate (MFR, unit: g/10 min)

The melt flow rate was measured according to the method provided in JIS K6758. The measurement was carried out at a temperature of 230° C. and a load of 2.16 kgf, unless otherwise stated.

(4) Tensile Testing (Breaking Elongation (UE), unit: %))

The breaking elongation was measured according to the method provided in ASTM D638. The breaking elongation (UE) was evaluated at a tensile rate of 20 mm/min by use of a 3.2-mm thick specimen produced by injection molding.

(5) Flexural Modulus (FM, unit: MPa)

The flexural modulus was measured according to the method provided in JIS K 7203. The measurement was carried out at a load rate of 2.0mm/min and a temperature of 23° C. using an injection molded specimen having a thickness of 6.4 mm and a span length of 100 mm.

(6) Izod Impact Strength (Izod, unit: kJ/m$^2$)

The Izod impact strength was measured according to the method provided in JIS K7110. The measurement was carried out at a temperature of 23° C. or −30° C. using a 6.4-mm thick notched specimen which was produced by injection molding followed by notching.

(7) Heat Distortion Temperature (HDT, unit: °C.)

The heat distortion temperature was measured according to the method provided in JIS K7207 at a fiber stress of 1.82 kgf/cm$^2$.

(8) Rockwell Hardness (HR, in R scale)

The Rockwell hardness was measured according to the method provided in JIS K7202. The measurement was carried out using a 3.0-mm thick specimen prepared by injection molding. The measurements are shown in R scale.

(9) Brittle Point (BP, unit: °C.)

The brittle point was measured according to the method provided in JIS K7216. The measurement was carried out using a specimen with dimensions 6.3×38×2 mm punched out from an injection molded plate with dimensions 25×150×2 mm.

(10) Isotactic Pentad Fraction ([mmmm])

The isotactic pentad fraction is a fraction of propylene monomer units existing at the center of an isotactic chain in the form of a pentad unit, in other words, the center of a chain in which five propylene monomer units are meso-bonded successively, in the polypropylene molecular chain as measured by a method disclosed in A. Zambelli et al., Macromolecules, 6, 925 (1973), namely, by use of $^{13}$C-NMR. The assignment of NMR absorption peaks was conducted according to Macromolecules, 8, 687 (1975).

Specifically, the isotactic pentad fraction was measured as an area fraction of mmmm peaks in all the absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

[Production of injection molded article: #1]

Specimens (injection-molded articles) for evaluation of physical properties in the above-mentioned (4)-(7) were prepared by injection molding at a molding temperature of 220° C., a mold cooling temperature of 50° C., an injection time of 15 seconds and a cooling time of 30 seconds using an injection molding machine, model IS150E-V, manufactured by Toshiba Machine Co., Ltd.

(11) Preparation of Injection Molded Article for Evaluation of Occurrence of Weld Lines and Flow Marks An injection molded article, which is a specimen for use in evaluation of occurrence of weld lines, was prepared by the following method.

Figure 1:
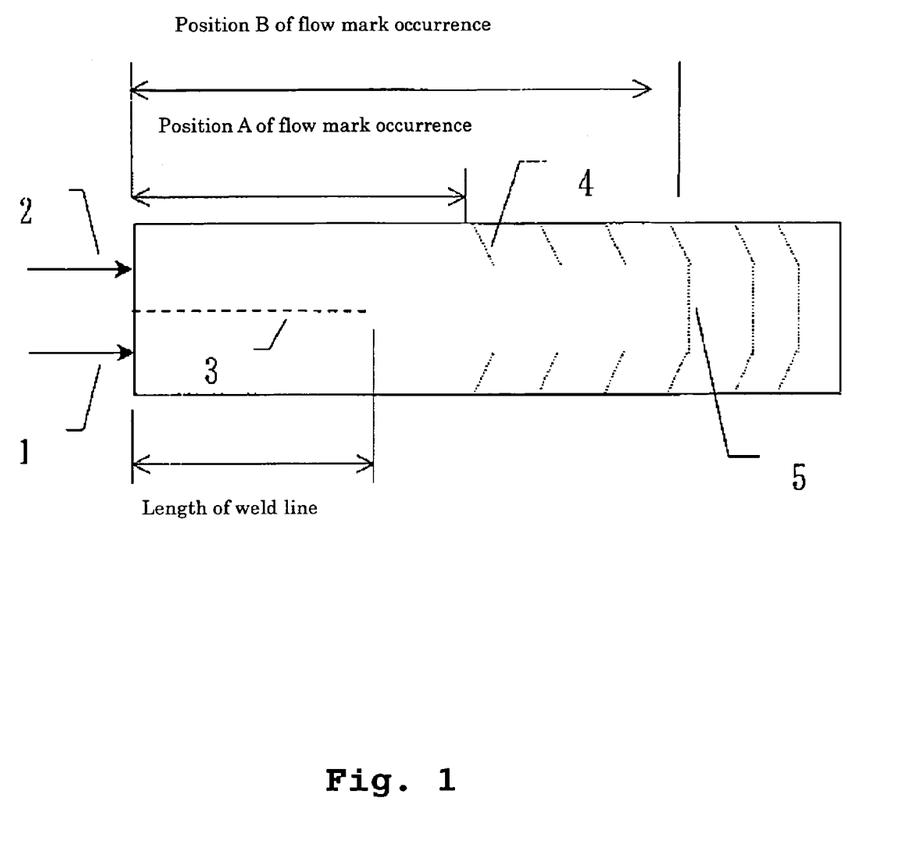
FIG. 1 shows a plan view showing a flat molded article for use in evaluation of appearance. In the FIG., 1: gate 1, 2: gate 2, 3: weld line, 4: flow mark A, and 5: flow mark B.

Molding was carried out at a molding temperature of 220° C. by use of an injection molding machine SE180D (manufactured by Sumitomo Heavy Industries, Ltd.) having a clamping force of 180 tons, equipped with a mold with cavity dimensions of 100×400×3.0 mm having twin parallel gates. Thus, a flat molded article shown in FIG. 1 was produced. In FIG. 1, numerals 1 and 2 indicate a two-point gate, numeral 3 indicates a weld line, numeral 4 indicates a flow mark A which occurred in an end face, and numeral 5 indicates a flow mark B which occurred in the central portion.

(12) Occurrence of Weld Line

Using the flat molded article prepared by the method of (11) above, a weld line was visually observed. The length and noticeability of a weld line shown in FIG. 1 were observed. The shorter the weld line, the better the appearance.

(13) Occurrence of Flow Mark

Using the flat molded article prepared by the method described in (11) supra, flow marks were visually observed. The distance from the gate edge to the line where a flow mark started to appear [flow mark occurring point A (occurring point closest to the end face) and flow mark occurring point B (occurring point on the center), unit: mm] and the degree of noticeability of a flow mark were observed. The longer the flow mark occurring distance or the less noticeable flow marks, the better the appearance.

(14) Density

The density of a polymer was measured according to the method provided in JIS K7112.

The methods for preparing three types of catalyst (solid catalyst components (I), (II) and (III)) used in the preparations of the polymers used in Examples and Comparative Examples are shown below.

(1) Solid Catalyst Component (I)

(1-1) Preparation of Reduced Solid Product

A 500-ml flask equipped with a stirrer and a dropping funnel was purged with nitrogen, and then 290 ml of hexane, 8.9 ml (8.9 g, 26.1 mmol) of tetrabutoxytitanium, 3.1 ml (3.3 g, 11.8 mmol) of diisobutyl phthalate and 87.4 ml (81.6 g, 392 mmol) of tetraethoxysilane were fed therein to yield a homogeneous solution. Subsequently, 199 ml of a solution of n-butylmagnesium chloride in di-n-butyl ether (manufactured by Yuki Gosei Kogyo Co., Ltd., n-butylmagnesium chloride concentration: 2.1 mmol/ml) was slowly added dropwise from the dropping funnel thereto over 5 hours while the temperature in the flask was maintained at 6° C. After completion of the dropping, the mixture was stirred at 6° C. for 1 hour, and additionally stirred for 1 hour at room temperature. Thereafter, the mixture was subjected to solid-liquid separation. The resulting solid was washed repeatedly with three portions of 260-ml toluene and then a proper amount of toluene was added thereto to adjust the slurry concentration to 0.176 g/ml. After sampling a part of the solid product slurry, its composition analysis was conducted, and as a result, the solid product was found to include 1.96% by weight of titanium atoms, 0.12% by weight of phthalic acid ester, 37.2% by weight of ethoxy groups and 2.8% by weight of butoxy groups.

(1-2) Preparation of Solid Catalyst Component

A 100 ml flask equipped with a stirrer, a dropping funnel and a thermometer was purged with nitrogen. Then, 52 ml of the slurry including the solid product obtained in the above (1) was fed in the flask, and 25.5 ml of supernatant was removed. Following addition of a mixture of 0.80 ml (6.45 mmol) of di-n-butyl ether and 16.0 ml (0.146 mol) of titanium tetrachloride and subsequent addition of 1.6 ml (11.1 mmol: 0.20 ml/l g-solid product), the system was heated to 115° C. and stirred for 3 hours. After completion of the reaction, the reaction mixture was subjected to solid-liquid separation at that temperature, followed by washing with two portions of 40-ml toluene at the same temperature. Subsequently, 10.0 ml of toluene and a mixture of 0.45 ml (1.68 mmol) of diisobutyl phthalate, 0.80 ml (6.45 mmol) of di-n-butyl ether and 8.0 ml (0.073 mol) of titanium tetrachloride were added to the solid, followed by a treatment at 115° C. for 1 hour. After completion of the reaction, the reaction mixture was subjected to solid-liquid separation at that temperature. The resulting solid was then washed with three portions of 40-ml toluene at that temperature and additionally with three portions of 40-ml hexane, and then dried under reduced pressure to yield 7.36 g of a solid catalyst component. The solid catalyst component was found to include 2.18% by weight of titanium atoms, 11.37% by weight of phthalic acid ester, 0.3% by weight of ethoxy groups and 0.1% by weight of butoxy groups. An observation of the solid catalyst component by a stereomicroscope revealed that the component included no fine powder and had a good powder property. This solid catalyst component is hereinafter called solid catalyst component (I).

(2) Solid Catalyst Component (II)

A 200-L cylindrical reactor having a diameter of 0.5 m which was equipped with a stirrer having three pairs of blades 0.35 m in diameter and also equipped with four baffle plates 0.05 m wide was purged with nitrogen. Into the reactor, 54 L of hexane, 100 g of diisobutyl phthalate, 20.6 kg of tetraethoxy silane and 2.23 kg of tetrabutoxy titanium were charged and stirred. Then, to the stirred mixture, 51 L of a solution of butylmagnesium chloride in di-n-butyl ether (concentration=2.1 mol/L) was dropped over 4 hour while the temperature inside the reactor was held at 7° C. The stirring speed during this operation was 150 rpm. After the completion of the dropping, the mixture was stirred at 20° C. for 1 hour and then was filtered. The resulting solid was washed with three portions of 70-L of toluene at room temperature. Toluene was added to the solid to yield a solid catalyst component precursor slurry. The solid catalyst component precursor contained 1.9% by weight of Ti, 35.6% by weight of OEt (ethoxy group), and 3.5% by weight of OBu (butoxy group). It had an average particle diameter of 39 μm and contained fine powder component with a diameter of up to 16 μm in an amount of 0.5% by weight. Then, toluene was drained so that the slurry volume became 49.7 L and the residue was stirred at 80° C. for 1 hour. After that, the slurry was cooled to a temperature of 40° C. or lower and a mixture of 30 L of titanium tetrachloride and 1.16 kg of di-n-butyl ether was added under stirring. Moreover, 4.23 kg of orthophthaloyl chloride was charged. After being stirred for 3 hours at a temperature inside the reactor of 110° C., the mixture was filtered and the resulting solid was washed with three portions of 90-L of toluene at 95° C. Toluene was added to the solid to form a slurry, which was subsequently left stand. Toluene was then drained so that the slurry volume became 49.7 L. Thereafter, a mixture of 15 L of titanium tetrachloride and 1.16 kg of di-n-butyl ether and 0.87 kg of diisobutyl phthalate was charged. After being stirred for 1 hour at a temperature inside the reactor of 105° C., the mixture was filtered and the resulting solid was washed with two portions of 90-L of toluene at 95° C. Toluene was added to the solid to form a slurry, which was left stand. Toluene was then drained so that the slurry volume became 49.7 L. Thereafter, a mixture of 15 L of titanium tetrachloride and 1.16 kg of di-n-butyl ether was charged. After being stirred for 1 hour at a temperature inside the reactor of 105° C., the mixture was filtered and the resulting solid was washed with two portions of 90-L of toluene at 95° C. Toluene was added to the solid to form a slurry, which was left stand. Toluene was then drained so that the slurry volume became 49.7 L. Thereafter, a mixture of 15 L of titanium tetrachloride and 1.16 kg of di-n-butyl ether was charged. After being stirred for 1 hour at a temperature inside the reactor of 105° C., the mixture was filtered and the resulting solid was washed with three portions of 90-L of toluene at 95° C. and two portions of 90-L of hexane. The resulting solid component was dried to yield a solid catalyst component. The solid catalyst component included 2.1% by weight of Ti and 10.8% by weight of phthalate component. This solid catalyst component is hereinafter called solid catalyst component (II).

(3) Solid Catalyst Component (III)

A 200-L SUS reactor equipped with a stirrer was purged with nitrogen, and then 80 L of hexane, 6.55 mol of tetrabutoxytitanium, 2.8 mol of diisobutyl phthalate and 98.9 mol of tetraethoxysilane were fed to form a homogeneous solution. Then, 51 L of a butylmagnesium chloride solution in diisobutyl ether at a concentration of 2.1 mol/L was dropped slowly over 5 hours while the temperature inside the reactor was held at 5° C. After the dropping, the mixture was stirred at 5° C. for 1 hour and at room temperature for additional 1 hour. Subsequently, the mixture was subjected to solid-liquid separation at room temperature, followed by washing with three portions of 70 L toluene. Then, the amount of toluene was adjusted so that the slurry concentration became 0.2 kg/L and the resulting slurry was stirred at 105° C. for 1 hour. Then, the mixture was cooled to 95° C. and 47.6 mol of diisobutyl phthalate was added, followed by a reaction at 95° C. for 30 minutes. After the reaction, the reaction mixture was subjected to solid-liquid separation, followed by washing with two portions of toluene. Then, the amount of toluene was adjusted so that the slurry concentration became 0.4 kg/L, 3.1 mol of diisobutyl phthalate, 8.9 mol of di-n-butyl ether and 274 mol of titanium tetrachloride were added, followed by a reaction at 105° C. for 3 hours. After the completion of the reaction, the reaction mixture was subjected to solid-liquid separation at that temperature, followed by washing with two portions of 90-L toluene at the same temperature. The amount of toluene was adjusted so that the slurry concentration became 0.4 kg/L, 8.9 mol of di-n-butyl ether and 137 mol of titanium tetrachloride were added, followed by a reaction at 105° C. for 1 hour. After completion of the reaction, the reaction mixture was subjected to solid-liquid separation at that temperature. The resulting solid was then washed with three portions of 90-L toluene at that temperature and additionally with three portions of 70-L hexane, and then dried under reduced pressure to yield 11.4 kg of a solid catalyst component. The solid catalyst component included 1.83% by weight of titanium atom, 8.4% by weight of phthalate, 0.30% by weight of ethoxy groups and 0.20% by weight of butoxy groups. This solid catalyst component is hereinafter called solid catalyst component (III).

Polymerization to Polymer (1) Polymerization to Propylene Homopolymer (HPP)

(1-1) Polymerization to HPP-1

(1-1a) Preliminary Polymerization

In a 3-L SUS autoclave equipped with a stirrer, 25 mmol/L of triethylaluminum (hereinafter abbreviated as TEA) and tert-butyl-n-propyldimethoxysilane (hereinafter abbreviated as tBunPrDMS) as an electron-donating component in a tBunPrDMS-to-TEA ratio of 0.1 (mol/mol) and also 15.6 g/L of the solid catalyst component (II) were added to hexane which had been fully dehydrated and degassed. Subsequently, preliminary polymerization was carried out by feeding propylene continuously until the amount of the propylene became 2.5 g per gram of the solid catalyst while keeping the temperature at 15° C. or lower. The resulting preliminary polymer slurry was transferred to a 120-L SUS dilution tank with a stirrer, diluted by addition of a fully refined liquid butane, and preserved at a temperature of 10° C. or lower.

(1-1b) Main Polymerization

In a fluidized bed reactor having a capacity of 1 m$^3$ and equipped with a stirrer, propylene and hydrogen were fed so as to keep a polymerization temperature of 70° C., a polymerization pressure of 1.8 MPa and a hydrogen concentration in the vapor phase of 11.7 vol % relative to propylene. Continuous vapor phase polymerization was carried out while continuously feeding 42 mmol/h of TEA, 12.3 mmol/h of tBunPrDMS and 1.28 g/h of the preliminary polymer slurry prepared in (1-1a) as solid catalyst components. Thus, 20.7 kg/h of polymer was obtained. The resulting polymer had an intrinsic viscosity $[\eta]_P$ of 1.08 dl/g and an isotactic pentad fraction of 0.987. The MFR was 56 g/10 min.

(1-2) Polymerization to HPP-2

(1-2a) Preliminary Polymerization

The preliminary polymerization was carried out in the same manner as HPP-1 except the solid catalyst component was changed to solid catalyst component (I).

(1-2b) Main Polymerization

Main polymerization was carried out in the same manner as in the preparation of HPP-1 except the hydrogen concentration in the vapor phase and the amount of the solid catalyst component supplied were adjusted. The resulting polymer had an intrinsic viscosity $[\eta]_P$ of 0.92 dl/g.

(2) Preparation of Propylene-ethylene Block Copolymer (BCPP)

(2-1) Preparation of BCPP-1

Five SUS reactors having a capacity of 45 or 32 m$^3$ equipped with a stirrer and a jacket were fully purged with propylene. The pressure in the first reactor was adjusted to 0.5 kgf/cm$^2$ with propylene and 20 m$^3$ of n-heptane was charged. After starting the stirrer, 50 mol of triethylaluminum and 7.5 mol of cyclohexylethyldimethoxysilane were fed and the temperature in the reactor was raised to 60-75° C. Subsequently, the reaction pressure was increased to 4-8 kgf/cm$^2$ with propylene. Hydrogen was fed so that the hydrogen concentration was kept at 6-8% and then solid catalyst component (III) was fed to start polymerization. At the same time, feeding of 2.5-3.0 kg/hr (about 24-25 mol/hr) of triethylaluminium was started. After the start of the reaction, the reaction pressure was increased to an intended level, namely 4.5-9.0 kgf/cm$^2$, while the stability in the reactor was checked. The polymerization was continued while propylene and hydrogen was supplied so that the hydrogen concentration in the vapor phase was kept to 8-10%. The resulting polymer slurry was discharged to the next reactor and was subjected to polymerization continuously under predetermined conditions. In the five reactors arranged in series, production of polypropylene portion (hereinafter, referred to as "P portion") by polymerization was continued. The P portion was sampled and analyzed. The P portion had an intrinsic viscosity $[\eta]_P$ of 0.93 dl/g.

The reaction pressure in the sixth through eighth reactors were increased to 2-4 kgf/cm$^2$ with propylene and ethylene, and polymerization of an ethylene-propylene copolymer portion (hereinafter, referred to as EP portion) was started. While the reaction pressure was kept to 2-4 kgf/cm$^2$ at a reaction temperature of 60° C., propylene/ethylene mixed gas was supplied continuously so that the hydrogen concentration in the vapor phase was kept to 0.1 to 0.2%. Thus, the polymerization of the EP portion was continued. The resulting polymer slurry was discharged to the next reactor and was subjected to polymerization continuously under predetermined conditions. Polymerization of the EP portion was continued in the three reactors arranged in series. The overall polymer slurry in the reactors was transferred to a deactivation vessel. The unreacted monomer was separated and deactivation treatment with water was conducted. Then, the polymer slurry was subjected to centrifugal separation to collect solid polymer, which was then dried in a drier. Thus, a white powder was obtained.

The finally-produced propylene-ethylene block copolymer had an intrinsic viscosity $[\eta]_T$ of 1.39 dl/g. An analysis revealed that the content of a propylene-ethylene random copolymer (EPcontent) in the propylene-ethylene block copolymer was 10% by weight. Therefore, the propylene-ethylene random copolymer component (EP portion) produced in the third reactor was found to have an intrinsic viscosity $[\eta]_{EP}$ of 5.5 dl/g. An analysis revealed that the EP portion had an ethylene content of 40% by weight and an isotactic pentad fraction of 0.974. The MFR was 50 g/10 min.

(2-1) Preparation of BCPP-2

After a SUS loop-type reactor having a capacity of 0.36 m$^3$ for liquid phase polymerization was purged fully with propylene, 0.105 mol/hr of triethylaluminium and 0.0057 mol/hr of tert-butyl-n-propyl-dimethoxysilane were fed. Then, the inner temperature was adjusted to 45-55° C. and the pressure was adjusted to 3.3-3.4 MPa with propylene and hydrogen, followed by continuous feeding of 0.040-0.050 kg/hr of solid catalyst component(II). Thus, polymerization was started. The polymer produced in the loop-typereactor for liquid phase polymerization was transferred to a vapor phase polymerization reactor. The vapor phase polymerization reactor included three reactors. In a first reactor (capacity: 45.75 m$^3$), production of a propylene homopolymer component by vapor phase polymerization was continued by continuously feeding propylene so as to keep the reaction temperature at 70° C. and the reaction pressure at 1.9 MPa and feeding hydrogen so as to keep the hydrogen concentration in the vapor phase at 17.5-18.5 vol %. Subsequently, the propylene homopolymer component produced in the first reactor was introduced into a second reactor intermittently. In the second reactor (capacity: 22.68 m$^3$), a propylene homopolymer component (hereinafter, referred to as polymer component (I)) was produced by continuing vapor phase polymerization while continuously feeding propylene so as to keep the reaction temperature at 70° C. and the reaction pressure at 1.5 MPa and feeding hydrogen so as to keep the hydrogen concentration in the vapor phase at 17.5-18.5 vol %. Subsequently, the propylene homopolymer component produced in the second reactor (polymer component (I)) was introduced into a third reactor intermittently. In the third reactor (capacity: 40.59 m$^3$), vapor phase polymerization for producing an ethylene-propylene copolymer component (hereinafter, referred to as polymer component (II)) was continued by continuously feeding propylene so as to keep the reaction temperature at 70° C. and the reaction pressure at 1.1 MPa, feeding hydrogen so as to keep the hydrogen concentration in the vapor phase at 2.5-3.5 vol % and feeding ethylene so as to keep the ethylene concentration in the vapor phase at 24-25 vol %. Subsequently, a powder composed of polymer component (I) and polymer component (II) in the reactor (third reactor) was introduced into a deactivation vessel intermittently and the catalyst component was deactivated with water. Then, the powder was dried in nitrogen at 80° C. to yield a white powder composed of propylene-ethylene block copolymer.

The polymer component (I) produced in the second reactor was sampled in a small amount and was analyzed. The analysis revealed that the polymer component (I) had an intrinsic viscosity $[\eta]_I$ of 0.90 dl/g and an isotactic pentad fraction of 0.983. The finally-produced propylene-ethylene block copolymer had an intrinsic viscosity $[\eta]_{Total}$ of 1.34 dl/g. An analysis revealed that the content of a propylene-ethylene random copolymer (EP content) in the propylene-ethylene block copolymer was 26.5% by weight. Therefore, the propylene-ethylene random copolymer component (EP portion) produced in the third reactor was found to have an intrinsic viscosity $[\eta]_{EP}$ of 2.6 dl/g. An analysis revealed that the ethylene content of the EP portion was 41% by weight. The results of the analysis of the resulting polymer are shown in Table 1. Using an extruder, 0.05 part by weight of calcium stearate (manufactured by NOF Corp.), 0.05 part by weight of 3,9-bis[2-{3-(3-tert-butyl-4-hydroxy-5-methylphenyl) propionyloxy}-1,1-dimethylethyl]-2,4,8,10-tetraoxaspiro [5.5]undecane (Sumilizer GA80, manufactured by Sumitomo Chemical Co., Ltd.) and 0.05 parts by weight of bis(2,4-di-tert-butylphenyl) pentaerythritol diphosphite (Ultranox U626, manufactured by GE Specialty Chemicals) as stabilizers were added to 100 parts by weight of the powder previously prepared, and the resulting mixture was then pelletized. The pellets had an MFR of 3650 g/10 min.

EXAMPLE 1

40% by weight of a powder of BCPP-1, 9.7% by weight of pellets of BCPP-2, 10% by weight of a powder of propylene homopolymer (HPP-1), 19% by weight of ethylene-butene-1 random copolymer rubber EBR-1 (TAFMER A0250 manufactured by Mitsui Industries, Inc., density: 0.861 g/cm$^3$, MFR (230° C., 2.16 kgf load): 0.46 g/10 min) as ethylene-a-olefin copolymer rubber (B) and 21.3% by weight of talc having an average particle diameter of 2.7 μm (commercial name: MWHST, manufactured by Hayashi Kasei Co., Ltd.) as inorganic filler (C) were blended and preliminally mixed uniformly in a tumbler. Then, the mixture was kneaded and extruded using a twin screw kneading extruder (TEX44SS 30BW-2V manufactured by The Japan Steel Works, Ltd.) at an extrusion rate of 50 kg/hr, 230° C. and a screw speed of 350 rpm, yielding a polypropylene resin composition.

In Table 1, the compounding amounts of the components and the MFR of the resulting polypropylene resin composition are shown. Moreover, the results of evaluation of physical properties, weld line condition and flow mark condition of an injection molded article are also shown.

EXAMPLE 2 AND COMPARATIVE EXAMPLE 1

Treatment the same as that of Example 1 was carried out by using a propylene-ethylene block copolymer (BCPP) and a propylene homopolymer (HPP) shown in Table 1. The MFR of the resulting resin composition and physical properties of an injection molded article were measured and the weld line condition and the flow mark condition of an injection molded article were evaluated. Evaluation results are shown in Table 2.

EXAMPLE 3

Treatment the same as that of Example 1 was carried out by using a propylene-ethylene block copolymer (BCPP) and a propylene homopolymer (HPP) shown in Table 1 and using 10% by weight of an ethylene-butene-1 random copolymer rubber EBR-1 (TAFMER A0250 manufactured by Mitsui Industries, Inc., density: 0.861 g/cm$^3$, MFR (230° C., 2.16 kgf load): 0.46 g/10 min) and 9% by weight of an ethylene-butene-1 random copolymer rubber EBR-2 (TAFMER A0550 manufactured by Mitsui Industries, Inc., density: 0.861 g/cm$^3$, MFR (230° C., 2.16 kgf load): 0.94 g/10 min) as ethylene-α-olefin copolymer rubber (B). The MFR of the resulting resin composition and physical properties of an injection molded article were measured and the weld line condition and the flow mark condition of an injection molded article were evaluated. Evaluation results are shown in Table 2.

COMPARATIVE EXAMPLE 2

Treatment the same as that of Example 3 was carried out by using a propylene-ethylene block copolymer (BCPP) and a propylene homopolymer (HPP) shown in Table 1. The MFR of the resulting resin composition and physical properties of an injection molded article were measured and the weld line condition the flow mark condition of an injection molded article were evaluated. Evaluation results are shown in Table 2.

TABLE 1

|  | unit | Example 1 | Example 2 | Example 3 | Comparative Example 1 | Comparative Example 2 |
| --- | --- | --- | --- | --- | --- | --- |
| BCPP-1 | wt % | 40 | 40 | 40 |  |  |
| BCPP-2 | wt % | 9.7 | 15 | 15 | 28 | 30 |
| HPP-1 | wt % |  | 4.7 | 4.7 |  | 18 |
| HPP-2 | wt % | 10 |  |  | 31 | 11.7 |
| EBR-1 | wt % | 19 | 19 | 10 | 19 | 10 |
| EBR-2 | wt % |  |  | 9 |  | 9 |
| Talc | wt % | 21.3 | 21.3 | 21.3 | 22 | 21.3 |
| MFR | g/10 min | 28 | 25 | 26 | 33 | 28 |
| UE | % | >500 | >500 | >500 | 126 | 210 |
| FM | MPa | 2044 | 1933 | 1927 | 2024 | 1965 |
| IZOD23° C. | kJ/m$^2$ | 42 | 48 | 48 | 29 | 29 |
| IZOD–30° C. | kJ/m$^2$ | 5.1 | 6.5 | 6.5 | 5.2 | 5.7 |
| HDT | ° C. | 68 | 67 | 67 | 67 | 67 |
| HR | R scale | 65 | 61 | 60 | 61 | 59 |
| BP | ° C. | −17 | −22 | −24 | −23 | −24 |
| Length of weld line | mm | 125 | 135 | 125 | 105 | 125 |

TABLE 1-continued

| | unit | Example 1 | Example 2 | Example 3 | Comparative Example 1 | Comparative Example 2 |
|---|---|---|---|---|---|---|
| Noticeability of weld line *1) | | ○ | ○ | ○ | ○ | ○ |
| Position A of flow mark occurrence | mm | 180 | 160 | 145 | 90 | 110 |
| Position B of flow mark occurrence | mm | None | 360 | None | 220 | 210 |
| Noticeability of flow mark *2) | | ○ | ○ | ○ | Δ | Δ |

*1) Noticeability of weld line in visual observation
○: There was no noticeable weld line,
x: There was a noticeable weld line.
*2) Noticeability of flow mark in visual observation
○: Flow marks were not noticeable.
Δ: Flow marks were moderately noticeable.
x: Flow marks were noticeable.

The polypropylene resin compositions of Examples 1-3 were superior in fluidity. Molded articles made from these compositions had no noticeable weld lines or flow marks and had good balance between rigidity and impact resistance.

Molded articles of Comparative Examples 1 and 2, in which the intrinsic viscosity $[\eta]_{EP}$ of the propylene-ethylene random copolymer portion of the polypropylene resin does not satisfy a requirement of the present invention, do not have satisfactory balance among rigidity, toughness and impact resistance and there are noticeable flow marks in molded articles.

The polypropylene resin composition of the present invention can be used in applications in which a high quality is demanded such as automotive interior or exterior components.

What is claimed is:

1. A polypropylene resin composition comprising:
   from 50 to 94% by weight of a polypropylene resin (A),
   from 1 to 25% by weight of an ethylene-α-olefin copolymer rubber (B) which includes units of α-olefin having 4-12 carbon atoms and ethylene units and has a density of from 0.850 to 0.870 g/cm³ and a melt flow rate, as measured at a temperature of 230° C. and a load of 2.16 kgf, of from 0.05 to 1 g/10 min, and
   from 5 to 25% by weight of an inorganic filler (C), provided that the overall amount of the polypropylene resin composition is 100% by weight,
   wherein the polypropylene resin (A) comprises a propylene-ethylene block copolymer (A-1) satisfying requirements (1), (2), (3) and (4) defined below or a polymer mixture (A-3) comprising the propylene-ethylene block copolymer (A-1) and a propylene homopolymer (A-2), and the polypropylene resin (A) further comprises a propylene-ethylene block copolymer (A-4) having a propylene-ethylene random copolymer portion, wherein the propylene-ethylene random copolymer portion included in the aforesaid block copolymer (A-4) has an intrinsic viscosity $[\eta]_{EP-A-4}$ of from 2 to 3 dl/g,
   requirement (1): the block copolymer (A-1) is a propylene-ethylene block copolymer comprising from 55 to 90% by weight of a polypropylene portion and from 10 to 45% by weight of a propylene-ethylene random copolymer portion, provided that the overall amount of the block copolymer (A-1) is 100% by weight,
   requirement (2): the polypropylene portion of the block copolymer (A-1) is a propylene homopolymer or a copolymer comprising propylene units and 1 mol % or less of units of a comonomer selected from the group consisting of ethylene and α-olefin having 4 or more carbon atoms, provided that the overall amount of units constituting the copolymer is 100 mol %,
   requirement (3): the weight ratio of the propylene units to the ethylene units in the propylene-ethylene random copolymer portion of the block copolymer (A-1) is from 70/30 to 50/50,
   requirement (4): the propylene-ethylene random copolymer portion of the block copolymer (A-1) has an intrinsic viscosity $[\eta]_{EP-A-1}$ of from 4.5 dl/g to 5.3 dl/g, and
   the propylene resin composition further comprises an aromatic vinyl compound-containing rubber having a molecular weight distribution of 2.5 or less, as determined by GPC.

2. The polypropylene resin composition according to claim 1, wherein the inorganic filler (C) is talc.

3. An injection molded article made from the polypropylene resin composition according to claim 1.

4. An injection molded article made from the polypropylene resin composition according to claim 2.

5. The polypropylene resin composition according to claim 1, wherein the aromatic vinyl compound-containing rubber contains units derived from aromatic vinyl compounds in an amount of 10 to 20% by weight, provided that the overall amount of the aromatic vinyl compound-containing rubber is 100% by weight.

6. The polypropylene resin composition according to claim 1, wherein the aromatic vinyl compound-containing rubber has a melt flow rate of 0.01 to 15 g/10 min, as measured at a temperature of 230° C. and a load of 2.16 kgf according to JIS K6758.

* * * * *